United States Patent [19]

Maehara et al.

[11] Patent Number: 4,703,078
[45] Date of Patent: Oct. 27, 1987

[54] POLYOLEFIN-BASED RESIN COMPOSITION

[75] Inventors: Junichiro Maehara; Kenzo Izumi; Ikuo Hirokawa, all of Sodegaura, Japan

[73] Assignee: Idemitsu Kosan Company Limited, Tokyo, Japan

[21] Appl. No.: 855,145

[22] Filed: Apr. 23, 1986

[30] Foreign Application Priority Data

Apr. 30, 1985 [JP] Japan ................................ 60-93384

[51] Int. Cl.⁴ ................................................ C08K 5/01
[52] U.S. Cl. ..................................... 524/476; 524/487; 524/570; 524/583; 524/585
[58] Field of Search ............... 524/476, 487, 570, 583, 524/585

[56] References Cited

U.S. PATENT DOCUMENTS

| | | | |
|---|---|---|---|
| 3,635,849 | 1/1972 | Hanson | 524/487 |
| 3,849,354 | 11/1974 | Strecker et al. | 524/476 |
| 3,907,735 | 9/1975 | Hollstein | 524/470 |
| 3,954,927 | 5/1976 | Duling et al. | 521/63 |
| 4,164,563 | 8/1979 | Chang | 514/773 |
| 4,305,855 | 12/1981 | Bretz | 524/583 |
| 4,501,846 | 2/1985 | Goss | 524/476 |

*Primary Examiner*—Melvyn I. Marquis
*Attorney, Agent, or Firm*—Frishauf, Holtz, Goodman & Woodward

[57] ABSTRACT

The polyolefin-based resin composition of the invention comprises (a) 100 parts by weight of a polyolefin-based resin such as polyethylenes, polypropylenes and copolymers of ethylene and propylene, (b) from 20 to 300 parts by weight of a wax such as a petroleum wax and (c) from 20 to 300 parts by weight of a mineral oil and/or a synthetic oil and the components are melted together into a uniform melt and then molded and solidified into a block or slab which is useful as a material for carving works. The material can be carved or engraved even by a child or a beginner in the art of carving works to create fine sculptures.

14 Claims, 6 Drawing Figures

POLYOLEFIN-BASED RESIN COMPOSITION

BACKGROUND OF THE INVENTION

The present invention relates to a polyolefin-based resin composition or, more particularly, to a polyolefin-based resin composition suitable as a material for shaping a carving block.

As is well known, wood, plaster and stone are some of the typical examples of the traditional materials of sculptures created by carving works. These materials, however, are not always quite satisfactory as a material for carving works, especially, when the carver has slight strength such as children or is a person with little experience in the art of carving. For example, material for carving works in the artistic education of children should not be too hard and brittle, have luster on the surface, be capable of giving a sharp edge by carving and be capable of being easily colored with an enamel paint, oil paint, oil color and the like. None of the traditional materials used in the carving works can satisfy all of these requirements simultaneously.

In place of or as a substitute for the traditional materials for carving works such as wood, plaster and stone, various kinds of synthetic resin-based compositions have been proposed as a material for shaping carving blocks including a composition composed of a polyolefin resin and an inorganic filler disclosed in Japanese Patent Kokai No. 38941/1974, a foamed polyethylene-based composition admixed with a calcium carbonate filler and polystyrene having a cellular structure disclosed in Japanese Patent Kokai No. 14772/1973, a composition composed of an atactic polypropylene, crystalline polypropylene, paraffin and lime disclosed in Japanese Patent Kokai No. 132252/1976, a composition for wood-like synthetic composed of a high molecular-weight plastic, low molecular-weight plastic and inorganic filler disclosed in Japanese Patent Koaki No. 147380/1984 and so on. These recently proposed polymeric compositions are also not quite satisfactory as a material for shaping a block for carving works which can simultaneously satisfy all of the above mentioned requirements.

SUMMARY OF THE INVENTION

An object of the present invention therefore is to provide a polymeric composition which is suitable as a material of a block for carving works having an adequate hardness without brittleness, a surface luster, being capable of giving a sharp edge by carving and being easily colored with an enamel paint, oil paint, oil color and the like so that even a child or a beginner in the carving works can create a fine sculpture without great difficulties.

Thus, the polymeric composition suitable as a material for carving works is a polyolefin-based resin composition which comprises:
(a) 100 parts by weight of a polyolefin-based resin;
(b) from 20 to 300 parts by weight of a wax; and
(c) from 20 to 300 parts by weight of an oily liquid selected from the group consisting of mineral oils and synthetic oils.

DETAILED DESCRIPTION OF THE PREFERRED EMBODIMENTS

Figure 1A:
FIGS. 1A to 1F each illustrate the form of the shavings obtained in the carving tests carried out in the Examples.

The polymeric component (a) according to the inventive composition is a polyolefin-based resin which is not particularly limitative to a specific type, including polyethylenes such as high-density polyethylenes referred to as HDPE, low-density polyethylenes referred to as LDPE, straightly linear low-density polyethylenes referred to as LLDPE and the like, polypropylenes, copolymers of ethylene and propylene and others as the examples of suitable ones. The polyolefin-based resin as component (a) should preferably have a viscosity-average molecular weight in the range from 10,000 to 500,000, specific gravity in the range from 0.88 to 0.99, melting point in the range from 90° to 160° C. and melt index MI in the range from 0.1 to 30 g/10 minutes or, more preferably, a viscosity average molecular weight in the range from 50,000 to 300,000, specific gravity in the range from 0.90 to 0.97, melting point in the range from 100° to 140° C. and melt index MI in the range from 0.5 to 20 g/10 minutes. These polyolefin-based resins are used either singly or as a combination of two kinds or more according to need. The polyolefin-based resin as the component (a) is swollen with the oily liquid, i.e. mineral oil and/or synthetic oil, as the component (c) and serves as a matrix phase to include the microcrystallites of the wax as the component (b) of the dispersed phase.

The component (b) comprised in the inventive polymeric composition is a wax which is usually defined as an ester of a carboxylic acid with a monohydric or dihydric higher alcohol but the wax implied in this invention also includes other broadly defined waxes such as those mainly composed of a fat or a hydrocarbon, e.g. vegetable waxes, petroleum waxes and the like. The wax may be liquid or solid at room temperature. The wax is not particularly limitative in respect of the origin including plants, animals and minerals and can be a natural wax, petroleum wax or synthetic wax.

Exemplary of the wax of the plant-origin are candelilla wax, vegetable wax and the like and exemplary of the wax of animal-origin are beeswax, lanolin and the like. The wax of mineral-origin is exemplified by ozokerite, ceresine and the like. The petroleum waxes, as a constituent of crude oils dissolved therein and recoverable therefrom, are classified into paraffin waxes, microcrystalline waxes and petrolatums. The synthetic waxes include coal-based waxes such as montan wax, polyolefin-based waxes such as polyethylene wax, Fischer-Tropsch type waxes such as Saxol wax, and the like. Any of the above named waxes can be used as the component (b) and they are used either singly or as a combination of two kinds or more according to need. The wax as the component (b) should be solid at room temperature and should preferably have a melting point higher than that of the polyolefin-based resin as the component (a).

The role played by the wax as the component (b) in a molten state at elevated temperatures is as a solvent in conjunction with the oily liquid, i.e. mineral oil and/or synthetic oil, as the component (c) to dissolve the polyolefin-based resin as the component (a) while the wax as solidified is swollen with the oily liquid to serve as a medium for retention thereof in a high content without causing the phenomenon of bleeding. The wax also contributes to increase the whiteness of the matrix by forming microcrystallites of a high degree of crystallinity to cause diffused reflection of visible light.

Several grades of commercial wax products to meet the requirements are available including Petroleum Wax 135° F. (a product by Taniguchi Petroleum Co.) having a melting point of 65° C. and a molecular weight of 800, Polyethylene Wax PE 192 (a product by Hoechst Co.) having a melting point of 99° C. and a molecular weight of 8000, Idemitsu PE Low Polymer (a product by Idemitsu Petrochemical Co., Ltd.) having a melting point of 90° C. and a molecular weight of 2000, and others.

The amount of the wax as the component (b) in the inventive composition should be in the range from 20 to 300 parts by weight or, preferably, from 50 to 200 parts by weight per 100 parts by weight of the polyolefin-based resin as the component (a). When the amount thereof is too small, the resin composition may have an increased hardness to cause difficulties felt in the carving works in addition to the disadvantage of bleeding of the oily fluid, i.e. mineral oil and/or synthetic oil, as the component (c) contained in the composition. When the amount of the wax is too large, on the other hand, the resin composition may have undesirable brittleness so that the edges formed by carving cannot be so sharp as desired.

The component (c) in the inventive polyolefin-based resin composition is an oily fluid selected from the group consisting of mineral oils, synthetic oils and mixtures thereof. The oily fluid should have a pour point at room temperature or below and a boiling point under normal pressure higher than the melting point of the polyolefin-based resin as the component (a). More particularly, the fluid should have a specific gravity in the range from 0.85 to 1.05 or, preferably, from 0.87 to 1.02 and a pour point at 25° C. or below or, preferably, at 10° C. or below. The kinematic viscosity of the fluid should be in the range from 1 to 10,000 centistokes or, preferably, from 5 to 800 centistokes or, more preferably, from 10 to 650 centistokes at 40° C. and in the range from 0.3 to 500 centistokes or, preferably, from 0.5 to 80 centistokes or, more preferably, from 2 to 60 centistokes at 100° C. Any of the mineral oils to meet the above mentioned requirements can be used including the aromatic, naphthenic and paraffinic fractions of petroleum. Usable synthetic oils include polybutene fluids, poly($\alpha$-olefin) fluids and the like. These mineral oils or synthetic oils can be used either singly or as a combination of two kinds or more according to need and any combination of a mineral oil and a synthetic oil is also suitable as the component (c). The oily fluid as the component (c) acts in two ways as a swelling agent of the polyolefin-based resin as the component (a) forming the matrix of the composition and as a lubricant on the surface of the microcrystallites of the wax as the component (b) so as to increase the smoothness in the movement of the chisel edge and to facilitate the carving works.

The amount of the oily fluid as the component (c) in the inventive resin composition should be in the range from 20 to 300 parts by weight or, preferably, from 50 to 200 parts by weight per 100 parts by weight of the polyolefin-based resin as the component (a). When the amount thereof is too small, the shavings formed by carving a block of the resin composition may be subject to brittle fracture so that an undesirable phenomenon of intermittent slip, called stick slip, is caused on the carved surface. Namely, an undulate or striated line pattern appears on the carved surface running in the direction perpendicular to the moving direction of the carving chisel so that the carved surface cannot have a smooth and beautiful appearance. When the amount of the oily fluid as the component (c) is too large in the resin composition, on the other hand, a phenomenon of bleeding may be caused which is in itself undesirable due to the destroyed beautifulness of the appearance in addition to the eventual adverse effect on the smooth and uniform spreading of a coloring material when the carved piece should be finished by coloring.

Although the essential constituents in the inventive polyolefin-based resin composition are the above described components (a), (b) and (c), it is optional according to need that the composition is further admixed with various kinds of known additives including pigments such as titanium dioxide, ivory black and the like, antioxidants such as polyphenols, phosphate ester compounds and the like, inorganic fillers such as talc, heavy calcium carbonate and the like, and so on.

The polyolefin-based resin composition of the invention can be prepared by merely mixing the above described component materials uniformly and the manner in which the materials are mixed together is not particularly limitative. For example, the wax is first added to the oily fluid and heated to be dissolved therein followed by the addition of the polyolefin-based resin which is then melted together by continued heating under agitation. Alternatively, the polyolefin-based resin alone is first melted by heating under agitation and then the wax is added to the molten resin finally followed by the addition of the oily fluid under continued heating and agitation to give a uniform mixture. Further, the component materials are introduced into an extrusion molding machine in which they are mixed together with heating into a uniform resin composition and the composition is molded by direct extrusion out of the machine into a shaped form usable as a carving block. Besides the above mentioned extrusion molding, the inventive polyolefin-based resin composition can be shaped by any other molding method such as compression molding in a metal mold into a desired form of slabs, rectangular blocks and the like.

An inorganic filler can be added in the ratio of 5 to 40% by weight, preferably 10 to 30% by weight to the resin composition of the present invention. The thus obtained composition is suitably used for injection molding.

The inorganic filler implied here should have an average particle size of 50 $\mu$m, preferably 20 $\mu$m to 1 $\mu$m and a specific surface of 0.5 to 50 m$^2$/g, preferably 1 to 20 m$^2$/g.

In the above case, linear low density polyethylene is preferably used as the component (a). And as the component (b), the synthetic wax is suitably used.

Further as the component (c), the paraffinic mineral oil is suitably used.

The polyolefin-based resin composition of the invention obtained in the above described manner is useful to give a slab or block for carving works having an adequate hardness without brittleness so as to greatly facilitate the carving works. In addition, the inventive resin composition is free from the problem of brittle fracture of shavings which is responsible for the undesirable phenomenon of stick slip on the carved surface along with the advantage of the sharpness of the edges formed by carving.

Moreover, the carved pieces of the inventive resin composition can easily be colored with an enamel paint, oil paint, oil color and the like in addition to the easiness in coloring the resin composition per se. Accordingly, the polyolefin-based resin composition of the invention can be advantageously utilized as a base material of blocks or slabs for carving works, in particular, for children and beginners in the art of carving.

In the following, the polyolefin-based resin composition of the invention is illustrated in more detail by way of examples and comparative examples, in which the expression of "parts" always refers to "parts by weight".

EXAMPLE 1

(Compositions No. 1 to No. 30 and comparative composition No. 1a)

Polyolefin-based resin compositions No. 1 to No. 30 according to the invention and a comparative composition No. 1a were prepared each by a batch-wise melting method under agitation in the following manner. In the preparation of the composition No. 1, 100 parts of an oily fluid, i.e. mineral oil, and 200 parts of a wax were introduced into a flask with a separable cover equipped with stirrer blades and provided with a thermostatted heating means and the mixture was heated at 60° to 70° C. under agitation so that the wax was melted and dissolved in the mineral oil. After temperature elevation up to 150° C., 100 parts of a polyolefin resin were added bit by bit into the mixture in the flask followed by the addition of each 0.5 part of a polyphenol-based antioxidant (Irganox 1010, a product by Ciba Geigy Co.) and a phosphate ester-based antioxidant (Ultranox 626, a product by Borg-Warner Co.) and the resin was melted and mixed with the mixture of the mineral oil and the wax. After keeping the melt for 30 minutes at 200° to 210° C. to ensure uniformity of the mixture, the melt was transferred to a vessel in a vacuum oven kept at the same temperature and deaerated by keeping there for 30 minutes under a reduced pressure of 1 mmHg or below followed by spontaneous cooling to give a solidified block in a yield of 99.2%. The thus obtained block suitable as a material for carving works had excellent whiteness and surface luster and gave pleasant feeling to the touching hand.

The procedures for the preparation of the other compositions were much the same as above with the same amount, i.e. 100 parts, of the polyolefin-based resin and the same kinds and amounts of the antioxidants. Table 1 below gives the types of the polyolefin-based resins, types and amounts of the waxes and types and amounts of the mineral oils or synthetic oils as well as the temperature and length of time in the final heating treatment of the melt. In the formulation of the compositions No. 3, No. 10 and No. 11, 100 parts of titanium dioxide (Tipaque R-680, a product by Ishihara Sangyo Co.) were added in addition.

The characterization of the components used in these preparations and indicated in Table 1 by the abridgements is as follows.

Polyolefin-based resins

LLDPE 1: Stamilex 1016 having a viscosity-average molecular weight of 106,000, specific gravity of 0.921, melting point of 122° C. and melt index of 1.0 g/10 minutes (a product by DSM Co.)

LLDPE 2: Stamilex 08-106 having a viscosity-average molecular weight of 80,000, specific gravity of 0.905, melting point of 121° C. and melt index of 6.7 g/10 minutes (a product by DSM Co.)

LLDPE 3: Stamilex 1048 having a viscosity-average molecular weight of 89,000, specific gravity of 0.921, melting point of 121° C. and melt index of 5.0 g/10 minutes (a product by DSM Co.)

LDPE 1: Petrothene 207 having a viscosity-average molecular weight of 111,000, specific gravity of 0.926, melting point of 108° C. and melt index of 8.6 g/10 minutes (a product by Toyo Soda Co.)

LDPE 2: Petrothene 172 having a viscosity-average molecular weight of 87,000, specific gravity of 0.924, melting point of 111° C. and melt index of 0.57 g/10 minutes (a product by Toyo Soda Co.)

PP 1: Idemitsu Polypropylene 700G having a viscosity-average molecular weight of 92,000, specific gravity of 0.91, melting point of 125° C. and melt index of 8 g/10 minutes (a product by Idemitsu Petrochemical Co., Ltd.)

PP 2: Idemitsu Polypropylene 740G having a viscosity-average molecular weight of 95,000, specific gravity of 0.90, melting point of 126° C. and melt index of 8 g/10 minutes (a product by Idemitsu Petrochemical Co., Ltd.)

HDPE 1: Idemitsu Polyethylene 110J having a viscosity-average molecular weight of 85,000, specific gravity of 0.965, melting point of 135° C. and melt index of 14 g/10 minutes (a product by Idemitsu Petrochemical Co., Ltd.)

HDPE 2: Idemitsu Polyethylene 440M having a viscosity-average molecular weight of 172,000, specific gravity of 0.954, melting point of 131° C. and melt index of 0.9 g/10 minutes (a product by Idemitsu Petrochemical Co., Ltd.)

Waxes

W: Petroleum Wax 135° F. having a melting point of 65° C. and number-average molecular weight of 800 (a product by Taniguchi Petroleum Co.)

LP: Idemitsu PE Low Polymer having a melting point of 90° C. and number-average molecular weight of 2000 (a product by Idemitsu Petrochemical Co., Ltd.)

Mineral oils

HG: Paraffinic mineral oil, Diana Process Oil PW-380 having a specific gravity of 0.8769 (15/4° C.), kinematic viscosity of 381.6 centistokes at 40° C. and 30.10 centistokes at 100° C. and pour point of −15.0° C. (a product by Idemitsu Kosan Co., Ltd.)

CP: Liquid paraffin, Idemitsu High-Purity Liquid Paraffin CP 38 having a specific gravity of 0.8700 (15/4° C.), kinematic viscosity of 95.50 centistokes at 40° C. and 11.30 centistokes at 100° C. and pour point of −15.0° C. (a product by Idemitsu Kosan Co., Ltd.)

Synthetic oils

I: Idemitsu Polybutene 15R having a specific gravity of 0.870 (15/4° C.), kinematic viscosity of 850 centistokes at 40° C. and 38 centistokes at 100° C., pour point of −15° C. and weight-average molecular weight of 570 (a product by Idemitsu Petrochemical Co., Ltd.)

II: Idemitsu Polybutene 100R having a specific gravity of 0.888 (15/4° C.), kinematic viscosity of 8300 centistokes at 40° C. and 220 centistokes at 100° C., pour point of −5° C. and weight-average molecular weight of 940 (a product by Idemitsu Petrochemical Co., Ltd.)

TABLE 1

| Composition No. | Polyolefin-based resin | Wax, parts W | Wax, parts LP | Mineral oil type | Mineral oil parts | Synthetic oil type | Synthetic oil parts | Final heating temperature, °C. | Final heating time, minutes |
|---|---|---|---|---|---|---|---|---|---|
| 1 | LLDPE 1 | 200 | — | HG | 100 | — | — | 200–210 | 30 |
| 2 | LLDPE 1 | 100 | — | HG | 100 | — | — | 200–210 | 30 |
| 3 | LLDPE 1 | 100 | — | HG | 100 | — | — | 200–210 | 30 |
| 4 | LLDPE 1 | — | 200 | HG | 100 | — | — | 200 | 30 |
| 5 | LLDPE 1 | — | 200 | HG | 200 | — | — | 210 | 30 |
| 6* | LLDPE 1 | — | 100 | HG | 100 | — | — | 230 | 30 |
| 7 | LLDPE 1 | — | 100 | HG | 200 | — | — | 200 | 30 |
| 8 | LLDPE 1 | — | 200 | HG | 100 | — | — | 250 | 30 |
| 9 | LLDPE 1 | 100 | 100 | HG | 100 | — | — | 225 | 30 |
| 10 | LLDPE 1 | 100 | 100 | HG | 100 | — | — | 250 | 30 |
| 11 | LLDPE 1 | 100 | 100 | HG | 100 | — | — | 250 | 30 |
| 12 | LLDPE 2 | — | 100 | HG | 100 | — | — | 200 (50 poise) | 30 |
| 13 | LLDPE 2 | — | 200 | HG | 100 | — | — | 170 | 30 |
| 14 | LLDPE 2 | — | 150 | HG | 100 | — | — | 190 (50 poise) | 30 |
| 15 | LLDPE 2 | — | 100 | HG | 100 | — | — | 190 (80 poise) | 30 |
| 16 | LLDPE 2 | 100 | 200 | HG | 100 | — | — | 180 (18 poise) | 30 |
| 17 | LLDPE 2 | — | 300 | HG | 100 | — | — | 170 (20 poise) | 30 |
| 18 | LLDPE 3 | — | 200 | HG | 100 | — | — | 160 | 30 |
| 19 | LDPE 1 | — | 200 | HG | 100 | — | — | 210 | 30 |
| 20 | LDPE 1 | — | 200 | HG | 100 | — | — | 210 | 30 |
| 21 | PP 1 | — | 200 | HG | 100 | — | — | 180 | 60 |
| 22 | PP 2 | — | 200 | HG | 100 | — | — | 180 | 60 |
| 23 | HDPE 1 | — | 200 | HG | 100 | — | — | 170 | 60 |
| 24 | HDPE 2 | — | 200 | HG | 100 | — | — | 205 | 60 |
| 25 | LLDPE 1 | 200 | — | — | — | I | 100 | 180 | 30 |
| 26 | LLDPE 1 | 100 | — | — | — | I | 100 | 180 | 30 |
| 27 | LLDPE 1 | — | 200 | — | — | II | 100 | 190 | 30 |
| 28 | LLDPE 1 | — | 100 | — | — | II | 100 | 190 | 30 |
| 29 | LLDPE 1 | 100 | 100 | — | — | II | 100 | 190 | 30 |
| 30 | LLDPE 1 | — | 200 | HG | 75 | II | 75 | 195 | 30 |
| 1a | LLDPE 1 | — | 200 | — | — | — | — | 200–210 | 30 |

*The wax was melted at 100° C.

The polyolefin-based resin compositions prepared in the above described manner were each subjected to the evaluation of the properties as a material for carving works with respect to the following items by the method described below.

1. Shaving test

Each block of the polyolefin-based resin compositions was shaved by use of a commercially available general-purpose carving chisel for wood block engraving having a curved edge (a product by Sunstar Co., junior class grade) and evaluation was performed in the following five respects.

(1) Readiness of shaving: comparison was made with a wood block for woodprint engraving as the reference and the results were recorded in four ratings as follows.

A: much better than the reference; B: better than the reference; C: about the same as the reference; and D: poorer than the reference (2) Separability of shavings: the chisel end at the end of a stroke into the block was flipped up to remove a train of the shavings and the separability of the shavings was compared with that from a wood block as the reference to record the results in the following three ratings.

A: better than the reference; B: about the same as the reference; and C: poorer than the reference (3) Luster on the shaved surface: the luster of the shaved surface was evaluated in the following three ratings.

A: excellent luster; B: good luster; and C: fair luster (4) Stick slip on the shaved surface: occurrence of stick slip, i.e. undulate or striated line pattern running perpendicularly to the carving direction, on the carved surface corresponding to the brittle fracture of shavings was observed and the smoothness of the carved surface was evaluated in the following three ratings.

A: excellently smooth carved surface; B: no stick slip occurred; and C: occurrence of stick slip.

(5) Form of the shavings: the condition of the shaving was evaluated in the following six ratings relative to the hardness and brittleness.

Figure 1B:
Figure 1C:
Figure 1D:
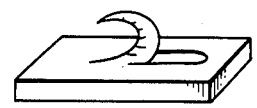
Figure 1E:
Figure 1F:
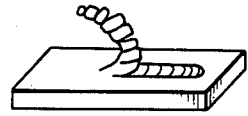

A: soft and easy to be carved, shavings in a train almost in parallel to the chisel edge as is shown in FIG. 1A; B: larger hardness than in A, shavings somewhat curled as is shown in FIG. 1B; C: larger hardness than in B, shavings curled with cracks on the inward lateral surface as is shown in FIG. 1C; D: larger hardness than in C, shavings curled with cracks extending from inward lateral surface to outward lateral surface as is shown in FIG. 1D; E: brittle fracture occurring in shavings and stick slip nearly to appear as is shown in FIG. 1E; and F: brittle fracture occurring in shavings and appearance of striated line pattern on the carved surface by stick slip as is shown in FIG. 1F.

2. Coloring test of the resin composition

The polyolefin-based resin was added to the mixture of the wax and oily fluid together with a red crayon in an amount of 5% by weight based on the overall amount of the component materials and, after solidification by cooling, uniformity of coloring of the resin composition was visually examined and evaluated in the following three ratings.

A: highly uniform coloring; B: uniform coloring; and C: lack of uniformity in coloring 3. Coating test A black acrylic lacquer was sprayed to the surface of the solidified block of the resin composition and the condition of the lacquer film formed on the surface was evaluated in the following three ratings.

A: uniform coating film; B: coating film with orange peel; and C: uneven coating film

4. Carving and surface coloring test (1) Carving test: relative evaluation was performed in the following three ratings making overall comparison with a commercially available wood block for woodprint engraving relative to the respects of (i) possibility of deep engraving and adaptability to three-dimensional carving, (ii) absence of carved surface texture against grains, and (iii) possibility of giving fine engraved lines in the direction of the chisel edge for a delicate expression.

A: much better than the reference; B: better than the reference; and C: about the same as or poorer than the reference (2) Surface-coloring test: evaluation was performed in the following three ratings relative to (i) the spreadability of an oil color when the block carved in (1) above was brush-coated with an oil color without using a thinner and (ii) the appearance when the oil-colored surface obtained in (i) above was coated six times with a varnish colored in dark brown color.

A: excellent appearance; B: good appearance; and C: poor appearance

5. Quantitative evaluation of the shapability with a shaper machine in terms of the stress on the cutting tool:

a cutting tool of high-speed steel having a rake angle of 30° and a clearance angle of 14° 22' was mounted on a shaper machine, with which several parallel grooves each having a width of 5 mm and a depth of 2 mm were engraved on the block of the resin composition at a pitch of 4 mm and a cutting speed of 5 meters/minute and the stress on the cutting tool was detected as an electric output from the strain gauge attached to the cutting tool. The thus obtained results were in good consistency with the organoleptic evaluation of the readiness of shaving using a carving chisel rated A to D in the above described shaving test. The correspondence between these two methods was as follows.

| Readiness of shaving with carving chisel | Stress on the cutting tool, kg/cm$^2$ |
| --- | --- |
| A | 5 to 8 |
| B | 10 to 15 |
| C | 20 to 40 |
| D | larger than 50 |

The results of the above described evaluation tests are summarized in Table 2 below for the polyolefin-based resin compositions No. 1 to No. 30 and the comparative resin composition No. 1a as well as a wood block for woodprint engraving and a plaster plate indicated as No. 2a and No. 3a, respectively, for comparative purpose. For further comparison, a sheet of the same polyolefin-based resin and a plate of the same wax as used in the preparation of the composition No. 1 were subjected to the same coating test as described above but no coating film of the lacquer could be formed at all on the surface due to the oil repellency of the surface.

TABLE 2

| Composition No. | 1. Shaving test (1) | (2) | (3) | (4) | (5) | 2. Coloring test of composition | 3. Coating test | 4. Carving & surface coloring test (1) | (2) | 5. Stress on cutting, tool, kg/cm$^2$ | Remarks |
| --- | --- | --- | --- | --- | --- | --- | --- | --- | --- | --- | --- |
| 1 | A | A | A | A | A | A | A | A | A | 5 | Hard type |
| 2 | A | A | A | A | A | A | A | A | A | 7 | Soft type |
| 3 | A | A | A | A | B | A | A | A | A | 8 | |
| 4 | A | A | A | A | B | A | A | A | A | 6 | Hard type |
| 5 | A | B | A | A | B | A | A | A | A | 7 | Soft type |
| 6 | A | A | A | A | B | A | A | A | A | 6 | Hard type |
| 7 | B | A | B | A | A | A | A | A | A | 7 | |
| 8 | A | A | A | A | B | A | A | A | B | 8 | Hard type |
| 9 | A | A | A | A | B | A | A | A | A | 6 | |
| 10 | A | A | A | A | B | A | A | A | A | 9 | |
| 11 | A | A | A | A | B | A | A | A | A | 8 | |
| 12 | A | A | B | A | B | A | A | A | A | 7 | |
| 13 | A | A | B | B | D | A | B | A | B | 8 | Hard type |
| 14 | A | A | B | A | B | A | A | A | A | 7 | |
| 15 | A | A | B | A | B | A | A | A | A | 8 | |
| 16 | B | A | B | B | D | A | B | A | B | 10 | |
| 17 | B | A | B | B | E | B | B | A | C | 12 | |
| 18 | A | A | A | A | B | A | A | A | B | 8 | |
| 19 | B | A | B | B | E | A | A | B | B | 12 | |
| 20 | B | A | B | B | E | A | A | B | B | 12 | |
| 21 | B | A | B | B | E | A | A | B | B | 14 | |
| 22 | B | A | B | B | E | A | A | B | B | 13 | |
| 23 | B | B | B | B | E | B | A | B | B | 16 | |
| 24 | B | B | B | B | E | B | A | B | B | 16 | |
| 25 | A | A | B | B | B | A | A | A | B | 6 | |
| 26 | B | A | A | B | A | A | A | B | B | 8 | |
| 27 | A | A | B | B | B | A | B | B | B | 5 | |
| 28 | B | A | A | B | B | A | A | A | B | 9 | |
| 29 | B | A | A | B | B | A | A | B | B | 8 | |
| 30 | A | A | B | B | A | A | B | A | B | 6 | |
| 1a | C | A | B | C | F | A | B | C | C | 22 | |
| 2a | * | * | C | C | D | — | B | * | C | 32 | |
| 3a | D | — | C | B | E | — | B | C | C | 51 | |

*Reference as the standard

EXAMPLE 2

Into a plastic mixer (Labo Plastomill of 100 ml capacity, manufactured by Toyo Seiki Co.) were introduced 100 parts of the same LLDPE resin as used in the preparation of the polyolefin-based resin composition No. 1 in Example 1 and the resin was melted by heating and kneaded for 2 minutes at 140° C. under mixing at 50 rpm. Thereafter, 200 parts of the same petroleum wax as used in the preparation of the composition No. 1 were added thereto and melted and mixed together for 30 seconds followed by further addition of 100 parts of the same mineral oil as used in the preparation of the composition No. 1 and mixing thereof for 1 minute. The thus obtained melt was cast into a metal mold and cooled and solidified therein into a block suitable as a material for carving works. This material had excellent whiteness and surface luster and gave pleasant touch to hand.

EXAMPLE 3

A polyolefin-based resin composition according to the invention was subjected to an extrusion test using an extrusion molding machine of 20 mm diameter provided with a heating means divided into 4 blocks of $T_1$ to $T_4$ from the hopper to the extrusion die. The temperatures of $T_1$ to $T_4$ were each kept at 130° C. and the machine was run at 40 rpm.

A blend of the same polyolefin-based resin and the same petroleum wax each as used in the preparation of the composition No. 1 in Example 1 in a blending ratio of 1:2 by weight was introduced into the hopper of the extruder machine as dry-blended. Further, the same mineral oil as used in the composition No. 1 was introduced into the machine through the vent line of the third block at a rate of one third of the overall amount of the resin and wax so that these three components were uniformly mixed and kneaded in the machine in a weight ratio of 100:200:100. The machine was operated in this manner for 1 hour and the extruded material was taken once for 1 minute in every 10 minutes so as to determine the stability of the rate of extrusion which was found to be 5.9±0.2 g/minute in each time of the sampling. The thus extruded melt was cast into a metal mold and cooled and solidified therein into a block suitable as a material for carving works. This material had excellent whiteness and surface luster and gave pleasant touch to hand.

EXAMPLE 4

(Compositions No. 31 to No. 36)

Polyolefin-based resin compositions No. 31 to No. 36 according to the invention were prepared each by a batch-wise melting method under agitation in the following manner. In the preparation of the composition Nos. 31 to 36, 200 parts of an oily fluid (Paraffinic mineral oil Diana Process Oil PW-380 having a specific gravity of 0.8769 (15/4° C.), kinematic viscosity of 381.6 centistokes at 40° C. and 30.10 centistokes at 100° C. and pour point of −15.0° C. (a product by Idemitsu Kosan Co.)), and 200 parts of a wax (Idemitsu PE Low Polymer having a melting point of 90° C. and number-average molecular weight of 2000) were introduced into a flask with a separable cover equipped with stirrer blades and provided with a thermostatted heating means and the mixture was heated at 60° to 70° C. under agitation so that the wax was melted and dissolved in the oily fluid. After temperature elevation up to 150° C., 100 parts of a polyolefin resin (Stamilex 1016 having a viscosity-average molecular weight of 106,000, specific gravity of 0.921, melting point of 122° C. and melt index of 1.0 g/10 minutes (a product by DSM Co.)) were added bit by bit into the mixture in the flask followed by the addition of the inorganic filler shown in Table 3, each 0.5 part of a polyphenol-based antioxidant (Irganox 1010, a product by Ciba Geigy Co.) and a phosphate ester-based antioxidant (Ultranox 626, a product by Borg-Warner Co.) to prepare a resin composition.

After keeping the melt, i.e. the resin composition for 30 minutes at 200° to 210° C. to ensure uniformity of the mixture, the melt was transferred to a vessel in a vacuum oven kept at the same temperature and deaerated by keeping there for 30 minutes under a reduced pressure of 1 mmHg or below followed by spontaneous cooling to give a solidified block in a yield of 99.2%. The thus obtained block suitable as a material for carving works had excellent whiteness and surface luster and gave pleasant feeling to the touching hand.

The thus obtained block suitable as a material for carving works were each subjected to the evaluation of the properties as a material for carving works in the same manner as shown in Example 1. The results are shown in Table 4.

Further, the above described resin composition were each subjected to the evaluation of the injection moldability by using an injection molding machine (IS-150, a product by Toshiba machinery Co., Ltd.).

The results are shown in Table 4.

The injection molding was performed under the following conditions.
(1) Molding temperature: 150° C.
(2) Molding pressure.
  Molding pressure at first stage: 5 kilograms per square centimeter (gauge) ($kg/cm^2G$).
  Molding pressure at second stage: 5 $kg/cm^2G$.
(3) Stroke of screw: 50 mm.
(4) Injection time: 10 seconds.
(5) Cooling time: 30 seconds.
(6) Shot volume: 60 g/one shot.

TABLE 3

| | Inorganic Filler | | | |
| --- | --- | --- | --- | --- |
| Composition No. | Type[*1] | Specific surface ($m^2/g$) | Average particle size (μm) | Amount compounded[*2] (wt %) |
| 31 | I | 12 | 0.25 | 44.4 |
| 32 | II | 120 | 150 | 16.7 |
| 33 | III | 40 | 4.1 | 28.6 |
| 34 | IV | 14 | 1 | 28.6 |
| 35 | V | 7 | 5 | 28.6 |
| 36 | VI | 635 | 125 | 9.1 |

[*1] I Titanium dioxide (JR401 produced by Teikoku Kako Co., Ltd.)
II γ-alumina (ACC-11 produced by Wako Pure Chemical Industries Ltd.)
III Hydrophobic silica (NIPPSIL, SS-70 produced by Nippon Silica Industrial Co., Ltd.)
IV Fine particle alumina (A32 produced by Nippon Light Metal Co., Ltd.)
V Fine particle alumina (A31 produced by Nippon Light Metal Co., Ltd.)
VI Silica gel for chromatography (#923 produced by Fuji Davison Chemical Co., Ltd.)

[*2] $\dfrac{\text{Amount of an inorganic filler}}{\text{Total amount of a polyolefin-base resin, a wax, an oil fluids and an inorganic filler}} \times 100$

TABLE 4

| Composition No. | 1. Shaving test | | | | | 2. Coloring test of composition | 3. Coating test | 4. Carving & surface coloring test | | 5. Stress on cutting tool, $kg/cm^2$ | 6. Injection* moldability |
| --- | --- | --- | --- | --- | --- | --- | --- | --- | --- | --- | --- |
| | (1) | (2) | (3) | (4) | (5) | | | (1) | (2) | | |
| 31 | A | B | A | A | A | A | A | A | A | 6 | X |

TABLE 4-continued

| Composition No. | 1. Shaving test (1) | (2) | (3) | (4) | (5) | 2. Coloring test of composition | 3. Coating test | 4. Carving & surface coloring test (1) | (2) | 5. Stress on cutting tool, kg/cm² | 6. Injection* moldability |
|---|---|---|---|---|---|---|---|---|---|---|---|
| 32 | B | A | B | B | C | B | A | B | B | 12 | X |
| 33 | B | A | A | B | C | A | A | B | B | 7 | O |
| 34 | A | A | A | A | B | A | A | A | A | 5 | O |
| 35 | A | A | A | A | B | A | A | B | A | 8 | O |
| 36 | A | A | B | B | B | A | A | B | A | 9 | X |

*Injection moldability was evaluated whether injection molding of the resin composition is applicable or not.
O: Applicable
X: No applicable

What is claimed is:

1. A polyolefin-based resin carving composition for forming a carving block which comprises:
   (a) 100 parts by weight of a polyolefin-based resin having a viscosity-average molecular weight in the range from 10,000 to 500,000, a specific gravity in the range from 0.88 to 0.99, a melting point in the range from 90° to 160° C. and a melt index in the range from 0.1 to 30 g/10 minutes; and selected from the group consisting of polyethylenes, polypropylenes and copolymers of ethylene and propylene;
   (b) from 20 to 300 parts by weight of a wax having a melting point at room temperature or higher and not exceeding the melting point of the polyolefin-based resin; and
   (c) from 20 to 300 parts by weight of an oily fluid having a specific gravity in the range from 0.85 to 1.05, a kinematic viscosity in the rnage from 1 to 10,000 centistokes at 40° C. and in the range from 0.3 to 500 centistokes at 100° C. and a pour point at 25° C. or below and being selected from the group consisting of mineral oils and synthetic oils.

2. The polyolefin-based resin composition as claimed in claim 1 wherein the amount of the component (b) is in the range from 50 to 200 parts by weight per 100 parts by weight of the component (a).

3. The polyolefin-based resin composition as claimed in claim 1 wherein the amount of the component (c) is in the range from 50 to 200 parts by weight per 100 parts by weight of the component (a).

4. The polyolefin-based resin composition as claimed in claim 1 wherein the polyolefin resin has a viscosity-average molecular weight in the range from 50,000 to 300,000, a specific gravity in the range from 0.90 to 0.97, a melting point in the range from 100° to 140° C. and a melt index in the range from 0.5 to 20 g/10 minutes.

5. The polyolefin-based resin composition as claimed in claim 1 wherein the wax is a natural wax, petroleum wax or synthetic wax.

6. The polyolefin-based resin composition as claimed in claim 1 wherein the oily fluid has a specific gravity in the range from 0.85 to 1.05, a kinematic viscosity in the range from 5 to 800 centistokes at 40° C. and in the range from 0.5 to 80 centistokes at 100° C. and a pour point at 25° C. or below.

7. A carving block formed of a polyolefin-based resin carving composition which comprises:
   (a) 100 parts by weight of a polyolefin-based resin having a viscosity-average molecular weight in the range from 10,000 to 500,000, a specific gravity in the range from 0.88 to 0.99, a melting point in the range from 90° to 160° C. and a melt index in the range from 0.1 to 30 g/10 minutes; and selected from the group consisting of polyethylenes, polypropylenes and copolymers of ethylene and propylene;
   (b) from 20 to 300 parts by weight of a wax having a melting point at room temperature or higher and not exceeding the melting point of the polyolefin-based resin; and
   (c) from 20 to 300 parts by weight of an oily fluid having a specific gravity in the range from 0.85 to 1.05, a kinematic viscosity in the range from 1 to 10,000 centistokes at 40° C. and in the range from 0.3 to 500 centistokes at 100° C. and a pour point at 25° C. or below and being selected from the group consisting of mineral oils and synthetic oils.

8. The carving block as claimed in claim 7 wherein the amount of the component (b) is in the range from 50 to 200 parts by weight per 100 parts by weight of the component (a).

9. The carving block as claimed in claim 7 wherein the amount of the component (c) is in the range from 50 to 200 parts by weight per 100 parts by weight of the component (a).

10. The carving block as claimed in claim 7 wherein the polyolefin resin has a viscosity-average molecular weight in the range from 50,000 to 300,000, a specific gravity in the range from 0.90 to 0.97, a melting point in the range from 100° to 140° C. and a melt index in the range from 0.5 to 20 g/10 minutes.

11. The carving block as claimed in claim 7 wherein the wax in a natural wax, petroleum wax or synthetic wax.

12. The carving block as claimed in claim 7 wherein the oily fluid has a specific gravity in the range from 0.85 to 1.05, a kinematic viscosity in the range from 5 to 800 centistokes at 40° C. and in the range from 0.5 to 80 centistokes at 100° C. and a pour point at 25° C. or below.

13. The carving block of claim 7 formed of the polyolefin-based resin carving composition which comprises:
   (a) the polyolefin-based resin having a viscosity-average molecular weight in the range from 50,000 to 300,000, a specific gravity in the range from 0.90 to 0.97, a melting point in the range from 100° to 140° C. and a melt index in the range from 0.5 to 20 g/10 minutes; and being selected from the group consisting of polyethylenes, polypropylenes and copolymers of ethylene and propylene;
   (b) from 50 to 200 parts by weight of the was selected from the group consisting of natural wax, petroleum or synthetic wax, and having a melting point at room temperature or higher and not exceeding the melting point of the polyolefin-based resin; and
   (c) from 50 to 200 parts by weight of the oily fluid, said oily fluid having a specific gravity in the range from 0.85 to 1.05, a kinematic viscosity in the range from 5 to 800 centistokes at 40° C. and a pour point at 25° C. or below.

14. The polyolefin-based resin carving composition of claim 1 which comprises:
   (a) the polyolefin-based resin having a viscosity-average molecular weight in the range from 50,000 to 300,000, a specific gravity in the range from 0.90 to 0.97, a melting point in the range from 100° to 140° C. and a melt index in the range from 0.5 to 20 g/10 minutes; and being selected from the group consisting of polyethylens, polypropylenes and copolymers of ethylene and propylene;
   (b) from 50 to 200 parts by weight of the wax selected from the group consisting of natural wax, petroleum or synthetic wax, and having a melting point at room temperature or higher and not exceeding the melting point of the polyolefin-based resin; and
   (c) from 50 to 200 parts by weight of the oily fluid, said oily fluid having a specific gravity in the range from 0.85 to 1.05, a kinematic viscosity in the range from 5 to 800 centistokes at 40° C. and a pour point at 25° C. or below.

* * * * *